M. MONTESSORI.
EDUCATIONAL DEVICE.
APPLICATION FILED JUNE 22, 1909.
1,103,369. Patented July 14, 1914.
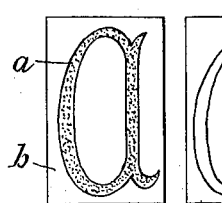
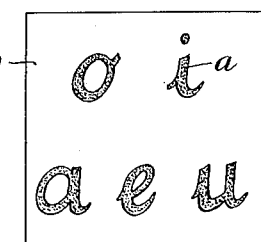
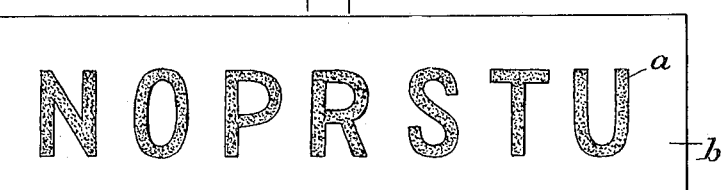
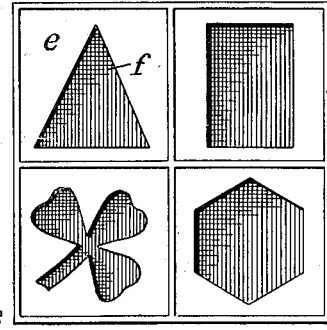
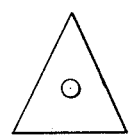
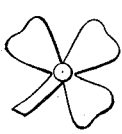
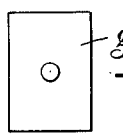
WITNESSES
G. V. Rasmussen
George Du Bon
INVENTOR
Maria Montessori
BY
Bresen Knauth
ATTORNEYS

UNITED STATES PATENT OFFICE.

MARIA MONTESSORI, OF ROME, ITALY.

EDUCATIONAL DEVICE.

1,103,369.     Specification of Letters Patent.     Patented July 14, 1914.

Application filed June 22, 1909. Serial No. 504,012.

*To all whom it may concern:*

Be it known that I, MARIA MONTESSORI, a subject of the King of Italy, residing at Rome, Italy, (whose post-office address is 60 Via Principe Eugenio,) medical doctor, have invented certain new and useful Improvements in Educational Devices, of which the following is a specification.

The present invention relates to didactic material for the instruction of children, and it is particularly designed to adapt their mental and muscular system to express itself in the form of writing. The means selected to accomplish this object are such as to permit the free natural manifestations of the child to become converted into an almost spontaneous capacity and desire for expression through the medium of written words or symbols.

Heretofore it has been generally assumed that in order to learn to write the child must first make vertical strokes and instruction with respect to the letters of the alphabet has usually commenced with capital letters of the printed type. This method of instruction caused the child to acquire, piece meal as it were, certain specific information without any desire on its part for such information and without any voluntary effort on the part of the child. The entire process of learning to write became to the child simply a difficult task.

It is the object of the present invention to bring about a condition in the mind of the child by which the first act of writing becomes voluntary and by which the formation of such writing is naturally prompted by the instinct of the child. In other words, by the means described herein it is intended to avoid the effort which is now generally believed to be a necessary accompaniment to learning to write since that effort being purely artificial is allied not to writing but to the methods by which it has been taught. The means which have been selected to bring about these results have for their object to prepare the child and more particularly the hand of the child so as to make it instinctively capable of writing before beginning to make it execute a task; in other words to teach it how to do something before it is asked to do it. The means of this application are therefore preparatory means to be used as a preliminary step before actual writing on the part of the child is begun.

Referring more particularly to the alphabet, the didactic apparatus of this application deals with configurations of the letters which correspond to the written language rather than the printed language. The letters are formed almost entirely of curved lines because the instinct of writing is one which has been ascertained to seek expression along such curved lines and to avoid artificial straight lines such as are used in printed letters. The letters of this application therefore are in flowing script, which is considered of fundamental importance. It is also important that each of the letters should have a relatively large surface so that every letter shall represent some special figure to the child. The size may obviously vary, but it should be such that it shall cause a distinct movement of the finger or arm of the child who follows the lines of the letter by passing over them with his finger. In other words the letters should be considerably larger than the ball of the index finger so that the finger must travel in completing the contour of the letter. These letters are to be used by having the children touch them repeatedly in the fashion of flowing writing until their systems become familiar with the shape of the letters not only through the eye, but also through the sense of touch and until they become familiar with the construction or direction of the lines which make up the letter, through their muscular system. Thereafter the child may be shown to repeat the exercises of passing its fingers over the letters now, however, using two fingers, the index finger and the middle finger and finally to do the same thing holding a stick in the hand in the same way as a pen or pencil is held in writing. In addition to the shape and size of the letters it has also been found that the design should furnish some kind of control, some mechanical guide, so that the design shall not be sensible in reality only to the eye but should in some fashion check or fix the visual object in the mind of the child. This is accomplished in the simplest form by cutting the letters of the alphabet out of sand paper and gluing them upon smooth cards thus making objects of them responsive to the tactile senses. Such an alphabet made of paper can be easily multiplied and can be used by many children at one time, not only for the recognition of letters but for the composition of words. This sand paper alphabet is the guide for the fingers which touch the letter so that no longer sight alone but the touch lends itself directly to teaching the movement of writing with exactness of control. If the child's finger leaves the rough surface of the letter the tactile sense immediately informs him. As a result he soon has a vivid muscular as well as visual picture of the form of the letter. According to this method the child thus learns to write by combining his muscular, tactile and visual senses instead of his visual sense only as is ordinarily the case, or his tactile sense only as in the case of blind children.

It is apparent that in connection with the use of these letters many auxiliary didactic devices may be employed as for instance coloring the vowels red and the consonants blue. It has also been found useful to associate the letters with some picture or representation of some common household article or familiar animal, the first letter of which when pronounced is the letter which the child is handling. In this way the linquistic defects of a child may come to light at the early and tender stage in its development. Some devices may also be advantageously adopted to make more or less prominent the direction of the letter which without some guide the child is apt to turn up side down or lay on its side. This may be accomplished by placing behind each letter a transverse strip of white paper, as for instance, in the letters shown in Figures 3 and 4, of the drawing. It has also been found advantageous to group vowels and letters separately as shown in Fig. 5. By putting away the letters in a case like the one illustrated in Fig. 7 having a separate compartment for each letter, there is not only offered to the eye of the child the possibility of comparing all of the letters and selecting the one he needs, but he is furnished with something definite that can be done in packing them away. Thus instead of being mere meaningless abstract symbols, letters so designed furnish fascinating material for interesting educational games.

The results accomplished by the use of the didactic material thus described have been astonishing. In some cases the children have written with a piece of chalk upon a black board in a firm hand the letters of the entire alphabet, writing for the first time and with great facility simply as an instinctive act of writing. When the system was first employed it was found that within three months some children four years old were each able to write letters of good wishes and thanks upon note paper without blot or erasure and in writing adjudged equal to that obtained in the third elementary grade, while the older children taking the standard course in learning to write were not yet out of the preliminary stages in which they were laboriously acquiring a knowledge of the formation of the letters.

In the accompanying drawings Figs. 1 and 2 represent face views of some of the letters of the alphabet cut out of sand paper and pasted on a smooth supporting member. The letters are designated as $a$ and the supporting member as $b$.

In Fig. 2 the letters are arranged so as to form a word.

Figs. 3 and 4 are similar views showing letters of the alphabet provided with what may be called transverse supporting or guiding members $c$. In these figures the vowels are illustrated as differently colored from the consonants. These letters with the guiding member $c$ shown in Figs. 3 and 4 may obviously be placed upon a supporting member like that employed in Figs. 1 and 2.

Figs. 5 and 6 show groups of such letters as are more or less easily pronounced, the letters of the groups being pasted on a single support member or piece of paste board $b$, while those more difficult to pronounce are separately grouped.

Fig. 7 represents a plan view of a container $d$, having separate compartments. When used for storing the letters shown in Figs. 1 to 4 a separate compartment is provided for each letter. Inasmuch as the invention is applicable not only to the teaching of script but to geometrical figures generally the container $d$ of Fig. 7 is shown as composed of various compartments $e$ and provided with depressions $f$ which correspond to the configurations of the inserts $g$ illustrated in Fig. 8. These inserts are centrally provided with a projected knob or button $h$ to enable them to be removed from or replaced within the recesses $f$ shown in Fig. 7.

It is obvious that other means the equivalent of sand paper may be employed for the formation of the letters so long as they respond to the tactile senses in a definite and positive manner. Thus for instance they may be formed as a roughened part of any otherwise smooth surface.

What I claim is:

1. Didactic material for the instruction of children comprising a multiplicity of units each containing as an essential feature a design of relatively large dimensions, the component parts of the design being wider than the ball of a child's finger tip, said design being flat, pronouncedly visible, and having a roughened surface continuously responsive to the touch of a finger moving over the surface of the components of the design.

2. Didactic material for the instruction of children comprising a multiplicity of units each containing as an essential feature a letter of the alphabet in flowing script each of said letters being flat, of relatively large area, the structures of the letters being wider than the ball of a child's finger tip, pronouncedly visible, and provided with a continuously roughened surface responsive to the touch of a finger moving over the surface of the letters.

3. Didactic material for the instruction of children comprising a multiplicity of units each containing as an essential feature a design of relatively large dimensions, the component parts of the design being wider than the ball of a child's finger tip, said design being flat, pronouncedly visible and having a roughened surface continuously responsive to the touch of a finger moving over the surface of the components of the design, each of said units being provided with a guiding member to indicate the direction of the character.

4. In an educational device a plurality of individual characters each carried by a backing material and comprising as its essential feature an irregular design of relatively large dimensions, the component parts of the design being wider than the ball of a child's finger tip and being pronouncedly visible, said units having a surface formation such as to produce a marked sensible effect upon a finger moving over the said units, supporting members for the said characters, the latter being grouped or arranged in a definite predetermined sequence.

5. Didactic material for the instruction of children, comprising a multiplicity of units each carried by a backing material and comprising as their essential feature an irregular design of relatively large dimensions, the component parts of the design being approximately as wide as a child's finger tip and being pronouncedly visible, said units having a surface configuration such as to produce a marked sensible effect upon a finger moving laterally from the backing on to the said units or from the units on to the backing and to establish a sensible impression of at least two contacts upon a finger moving along the said units.

In testimony whereof I have affixed my signature in presence of two witnesses.

MARIA MONTESSORI.

Witnesses:
 DUILIO NARDONI,
 G. LENZE.